United States Patent
Shaw et al.

(10) Patent No.: US 6,254,347 B1
(45) Date of Patent: Jul. 3, 2001

(54) STRIATED COOLING HOLE

(75) Inventors: James S. Shaw, Hampton Falls, NH (US); James N. Fleck, Boxford, MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/432,789

(22) Filed: Nov. 3, 1999

(51) Int. Cl.[7] .................................................. B63H 1/14
(52) U.S. Cl. .......................................................... 416/97 R
(58) Field of Search ................... 416/96 R, 115

(56) References Cited

U.S. PATENT DOCUMENTS

| | | | |
|---|---|---|---|
| 3,801,218 | * 4/1974 | Moore | 416/97 R |
| 4,407,632 | * 10/1983 | Liang | 416/97 R |
| 4,669,957 | * 6/1987 | Phillips et al. | 416/97 R |
| 4,738,588 | * 4/1988 | Field | 416/97 R |
| 5,738,493 | * 4/1998 | Lee et al. | 419/97 R |
| 5,752,801 | * 5/1998 | Kennedy | 415/115 |

OTHER PUBLICATIONS

*Machining Data Handbook*, 3rd edition, vol. 2, 1980, pp.11–69 & –70.

* cited by examiner

Primary Examiner—John E. Ryznic
(74) Attorney, Agent, or Firm—Andrew C. Hess; Gerry S. Gressel

(57) ABSTRACT

A turbine airfoil includes pressure and suction sides extending longitudinally from root to tip, and chordally between leading and trailing edges. A striated discharge hole terminates outside the airfoil for discharging coolant therefrom.

20 Claims, 4 Drawing Sheets

US 6,254,347 B1

STRIATED COOLING HOLE

BACKGROUND OF THE INVENTION

The present invention relates generally to gas turbine engines, and, more specifically, to turbine flowpaths therein.

In a gas turbine engine, air is pressurized in a compressor and mixed with fuel and ignited in a combustor for generating hot combustion gases. The gases flow through turbine stages including stator vanes and rotor blades which extract energy from the gases for powering the compressor and producing power for propelling an aircraft in flight for example.

The turbine vanes and blades include airfoils which are bathed in the hot combustion gases during operation, and are therefore typically cooled. Airfoil cooling is effected by bleeding a portion of pressurized air from the compressor and channeling it through the airfoils in various manners of cooling thereof.

Each airfoil may have one or more internal cooling channels which distribute the cooling air therethrough, which is then discharged from the airfoil through various outlet holes formed through the wall thereof.

Since bleeding compressor air for cooling the turbines necessarily decreases overall efficiency of the engine, maximum cooling efficiency of that bled air is desired. The prior art is quite crowded with various forms of internal cooling circuits in turbine vanes, blades, and shrouds, and various forms of discharge holes including film cooling holes and trailing edge cooling holes.

Trailing edge cooling is particularly problematic in view of the relative thinness of the airfoil thereat. An airfoil includes pressure and suction sides which extend from root to tip, and are joined at opposite leading and trailing edges. The pressure and suction sides converge to the trailing edge which may be about 30 mils (0.76 mm) thick or less.

A typical trailing edge cooling design includes a row of axially extending discharge holes spaced apart radially along the longitudinal span of the airfoil. In view of the relative thinness of the airfoil trailing edge, this region of the airfoil is typically solid except for the trailing edge discharge holes typically centered in the wall between the opposite pressure and suction sides. The trailing edge holes extend axially forwardly to a common supply channel in which compressor bleed air is channeled for providing a coolant. The coolant air is discharged through the trailing edge holes for cooling the trailing edge region by internal convection.

The trailing edge cooling holes must necessarily have small diameters to fit within the narrow width of the trailing edge wall. The holes are correspondingly relatively long, with a length-to-diameter ratio up to about 50, for example.

Accordingly, as the coolant flows through the slender trailing edge holes, heat is absorbed from the airfoil by convection. Convection cooling is limited in capability, and therefore the density of the trailing edge cooling holes is typically high for effectively cooling the trailing edge.

As turbine operating temperatures increase, and blade size decreases, the problem of effective trailing edge cooling increases. Additional compressor bleed air may be required for meeting the higher heating demands of the blade resulting in a corresponding reduction in engine efficiency.

Accordingly, it is desired to further increase the cooling efficiency of turbine engine components.

BRIEF SUMMARY OF THE INVENTION

A turbine component includes a wall having internal and external surfaces. A striated discharge hole extends through the wall and terminates outside the wall for discharging coolant therethrough.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
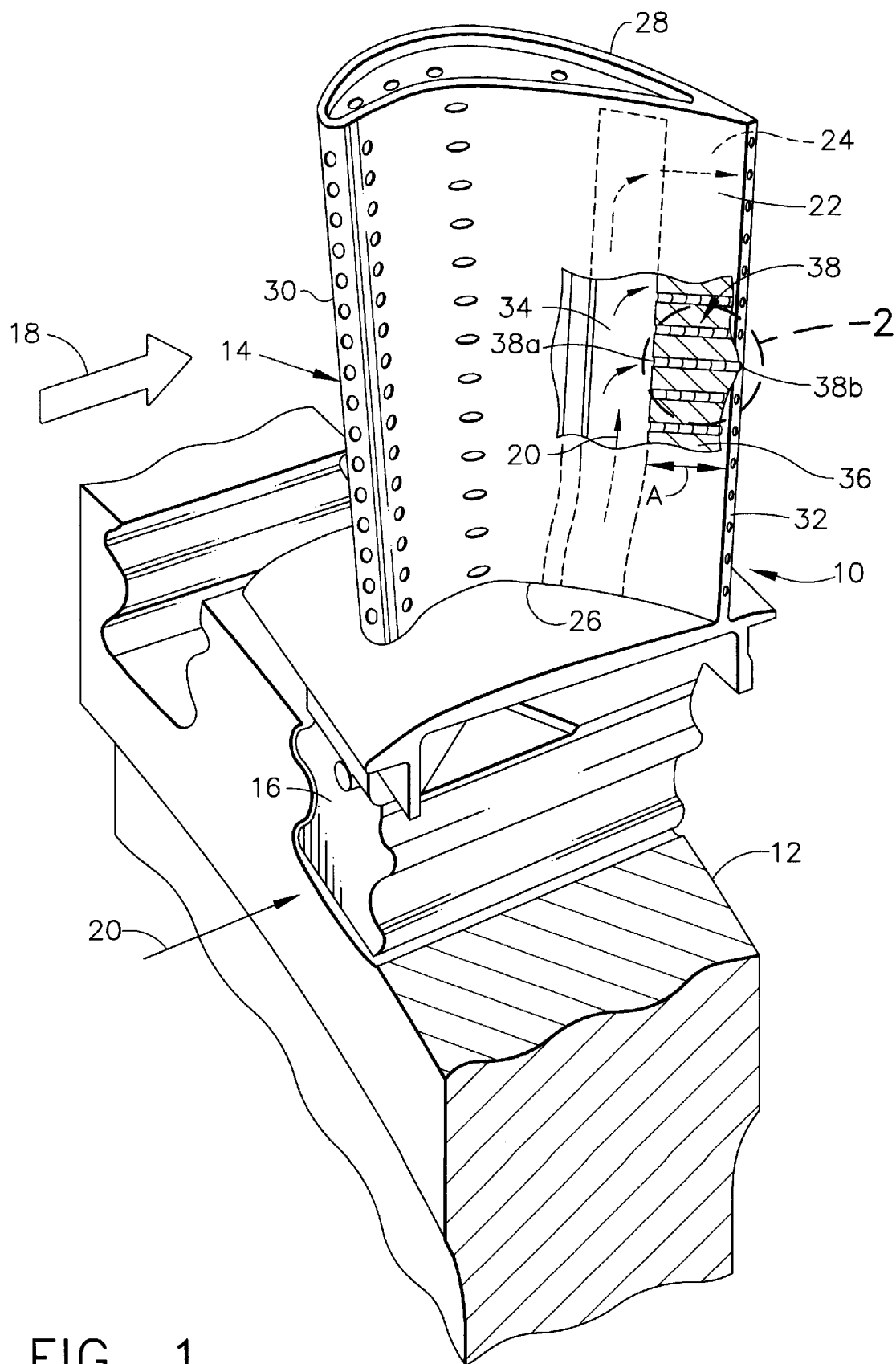
FIG. 1 is an isometric view of an exemplary turbine blade having an airfoil with striated discharge holes in accordance with an exemplary embodiment of the present invention.

Illustrated in FIG. 1 is an exemplary turbine rotor blade 10 of a gas turbine engine. The blade is one of a full row of blades extending radially outwardly from a supporting rotor disk 12, shown in part.

The blade may have any conventional configuration including an airfoil 14 extending from an integral dovetail 16 which mounts the blade in a corresponding dovetail slot in the perimeter of the disk.

During operation, hot combustion gases 18 are generated in a combustor (not shown) and are channeled past the turbine airfoils which extract energy therefrom. The turbine airfoils are therefore heated by the combustion gases and are typically internally cooled by bleeding a portion of pressurized air 20 from a compressor (not shown), which air provides a coolant suitably channeled through the dovetail 16 and into the airfoil.

Although a typical rotor blade is illustrated in FIG. 1 in an exemplary embodiment, the present invention may also be practiced in other engine components which require cooling. For example, turbine stator vanes (not shown) have similar airfoils specifically configured in an annular nozzle mounted between radially inner and outer supporting bands. Both the blades and vanes have corresponding internally cooled airfoils which may be modified in accordance with the present invention for providing enhanced cooling thereof. Furthermore, turbine shrouds and vane bands are yet additional components which may enjoy enhanced cooling.

More specifically, the airfoil 14 illustrated in FIG. 1 includes a generally concave, pressure side 22, and a circumferentially opposite, generally convex, suction side 24. The two sides extend longitudinally over the radial span of the airfoil from a root 26 to a tip 28. The two sides also extend axially or chordally between leading and trailing edges 30,32.

The airfoil may have any conventional internal cooling configuration desired, such as one or more internal cooling channels 34 through which the coolant 20 is channeled. The cooling channels may be single pass extending from root to tip, or may be serpentine cooling channels having multiple passes inside the airfoil. The coolant is discharged from the airfoil through various forms of discharge holes including film cooling holes along the surface of the airfoil and tip holes at the tip thereof.

In the exemplary embodiment illustrated in FIG. 1, the airfoil includes a solid wall 36 along its trailing edge 32 through which a plurality of longitudinally or radially spaced apart discharge cooling holes 38 are disposed in a row between the pressure and suction sides of the wall 36. The trailing edge holes 38 are disposed in flow communication with the cooling channel 34 for discharging the coolant 20 therefrom while cooling the trailing edge region of the airfoil.

In accordance with the present invention, the trailing edge holes 38 are striated along their longitudinal axes for tripping the coolant as it flows therethrough for enhancing heat transfer capability thereof. Enhanced heat transfer in the trailing edge holes increases the efficiency of cooling and therefore permits a reduction in the amount of air bled from the compressor for this purpose, or, alternatively, permits the airfoil to be operated under greater combustion gas temperature. In either option, the available cooling air is more efficiently and effectively utilized for increasing the overall efficiency of the engine.

The trailing edge holes 38 illustrated in FIG. 1 initiate inside the airfoil in flow communication with the cooling channel 34 and extend through the trailing edge wall 36 between the pressure and suction sides to terminate outside the airfoil along the trailing edge 32 itself. In alternate embodiments, the trailing edge holes 38 may terminate along the pressure side of the airfoil if desired. Although the striated hole is configured for cooling the trailing edge in this exemplary embodiment, it may also be used at other locations in the airfoil as desired, as well as in other engine components requiring cooling.

The striated hole 38 includes an inlet 38a joined to the cooling channel 34 for receiving a portion of the coolant therefrom. Each hole also includes an outlet 38b disposed outside the airfoil, along the trailing edge for example, for discharging the coolant.

The striated holes 38 are preferably arranged in a row spaced longitudinally apart between the root 26 and the tip 28 along the trailing edge 32, with all of the holes terminating along the trailing edge in the exemplary embodiment illustrated. In this configuration, the striated holes 38 are relatively long compared to their diameter for extending through the relatively thin trailing edge wall 36 of the airfoil between its pressure and suction sides. Each of the striated holes has an axial length A measured between its inlet and outlet, which is substantially greater than the diameter B of the hole, and therefore the striations are provided to enhance cooling of these long and slender holes.

Figure 2:
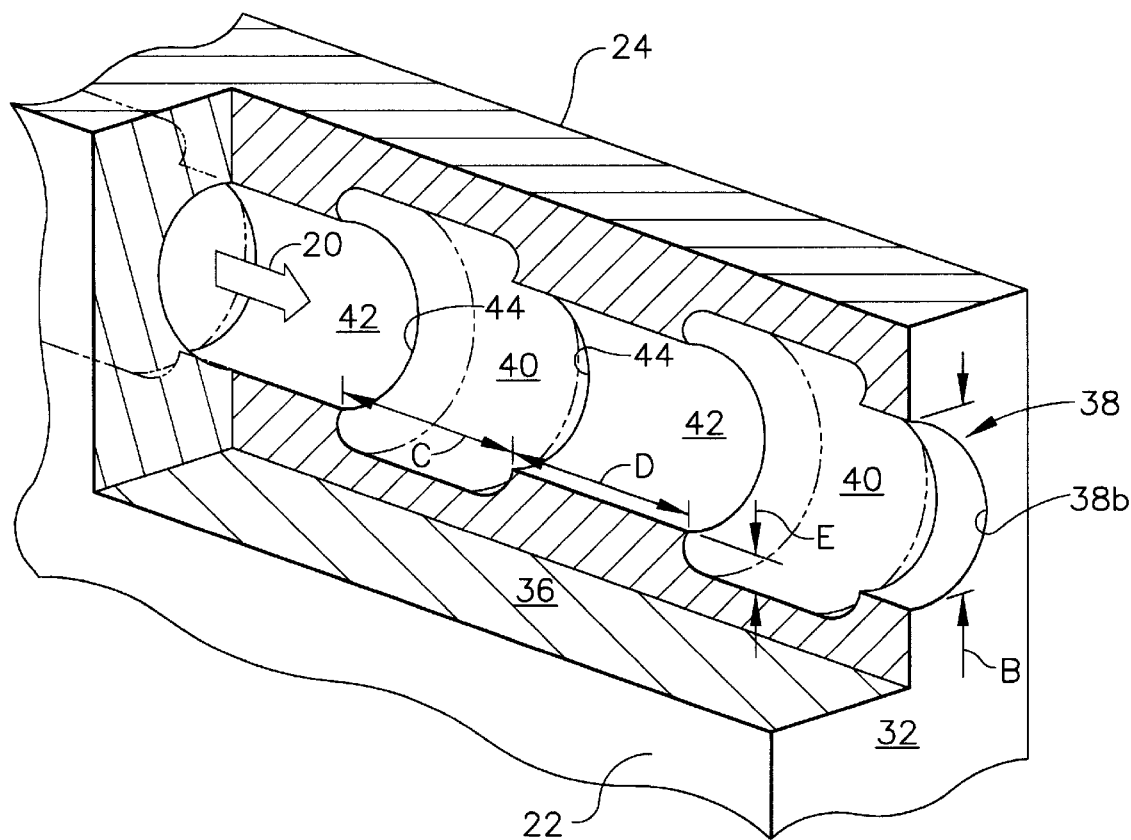
FIG. 2 is an isometric, sectional view of a portion of one of the striated discharge holes illustrated in FIG. 1 within the dashed circle labeled 2 in accordance with an exemplary embodiment of the present invention.

FIG. 2 illustrates in more particularity an exemplary portion of one of the striated holes 38 illustrated in FIG. 1. Each striated hole includes alternating annular grooves 40, and tubular hole segments or lands 42 which are effective for tripping the coolant 20 for promoting turbulence thereof and increasing heat transfer capability during operation. The grooves and lands preferably alternate over the full axial length of each striated hole from its inlet to outlet for enhancing cooling effectiveness over the entire length thereof.

The grooves and lands are preferably coaxially aligned along a common longitudinal centerline axis thereof for effecting a straight discharge hole. Each hole has a nominal diameter B as measured at the tubular lands, and the collective length of the grooves and lands between the inlet and outlet of the hole is substantially greater than the nominal width or diameter of the hole to fit within the available space provided in the thin wall 36 between the pressure and suction sides along the trailing edge.

Each of the lands 42 is preferably tubular with parallel opposite circular ends and a relatively smooth surface. Each of the grooves 40 is also preferably tubular with parallel opposite circular ends and a relatively smooth surface. In this configuration, each of the grooves 40 is circumferentially continuous axially between adjoining lands 42 without spiraling. In an alternate embodiment (not shown) both the grooves 40 and lands 42 may spiral around the longitudinal axis of the striated hole if desired.

The purpose of the grooves 40 is to introduce local interruptions in the flow of coolant 20 for enhancing heat transfer thereof. Since the nominal diameter B of the striated holes is relatively small, any obstruction to the free flow of the coolant must be avoided. In a typical trailing edge application, the nominal diameter B of the striated holes may be as little as about 8 mils (0.20 mm), with a hole length A of about 300 mils (7.6 mm).

Accordingly, by introducing the grooves 40 in the otherwise smooth trailing edge holes, the coolant 20 may be tripped for enhancing the cooling effectiveness thereof. In an exemplary embodiment, the individual grooves 40 are axially elongated and have a nominal axial length C which may be equal to about the diameter B of the hole. Similarly, each land 42 has an axial length D which may be equal to about the length C of a corresponding groove and also equal to the hole diameter B.

The individual grooves 40 are preferably tubular over their axial extent and have a suitably larger diameter than the nominal diameter B of the holes by being recessed in radius by a depth E as measured from the perimeter of the land 42. The groove depth E may be about one quarter the nominal diameter B of the hole, with the corresponding diameter of the annular groove 40 being about 50% greater than the nominal hole diameter B in the exemplary embodiment.

In the preferred embodiment illustrated in FIG. 2, the grooves 40 undercut adjoining ones of the lands 42 at corresponding cusps 44 which define the interfaces therebetween. The cusp 44 is relatively sharp with at preferably acute included angle measured along the axis of the hole. In this way, as the coolant 20 flows through the individual striated holes, it locally expands in each annular groove 40 and is interrupted by the cusp 44 as it converges through the narrower annular land 42. This expansion and contraction of the coolant is repeated from groove to groove along the length of each striated hole, with turbulence being promoted at each land.

The striated holes 38 are particularly effective for increasing heat transfer for relatively long and slender holes having length-to-diameter ratios substantially greater than 1.0, and up to about 50 for example. The striated holes may therefore be used at any location in a turbine blade or vane for enhancing heat transfer. Similarly, the striated holes may be used in any other engine component wherein enhanced cooling is desired. For example, turbine shrouds surround the tips of rotor blades during operation and are typically air cooled. The shrouds may include cooling holes extending therethrough which may be striated in accordance with the present invention.

Figure 3:
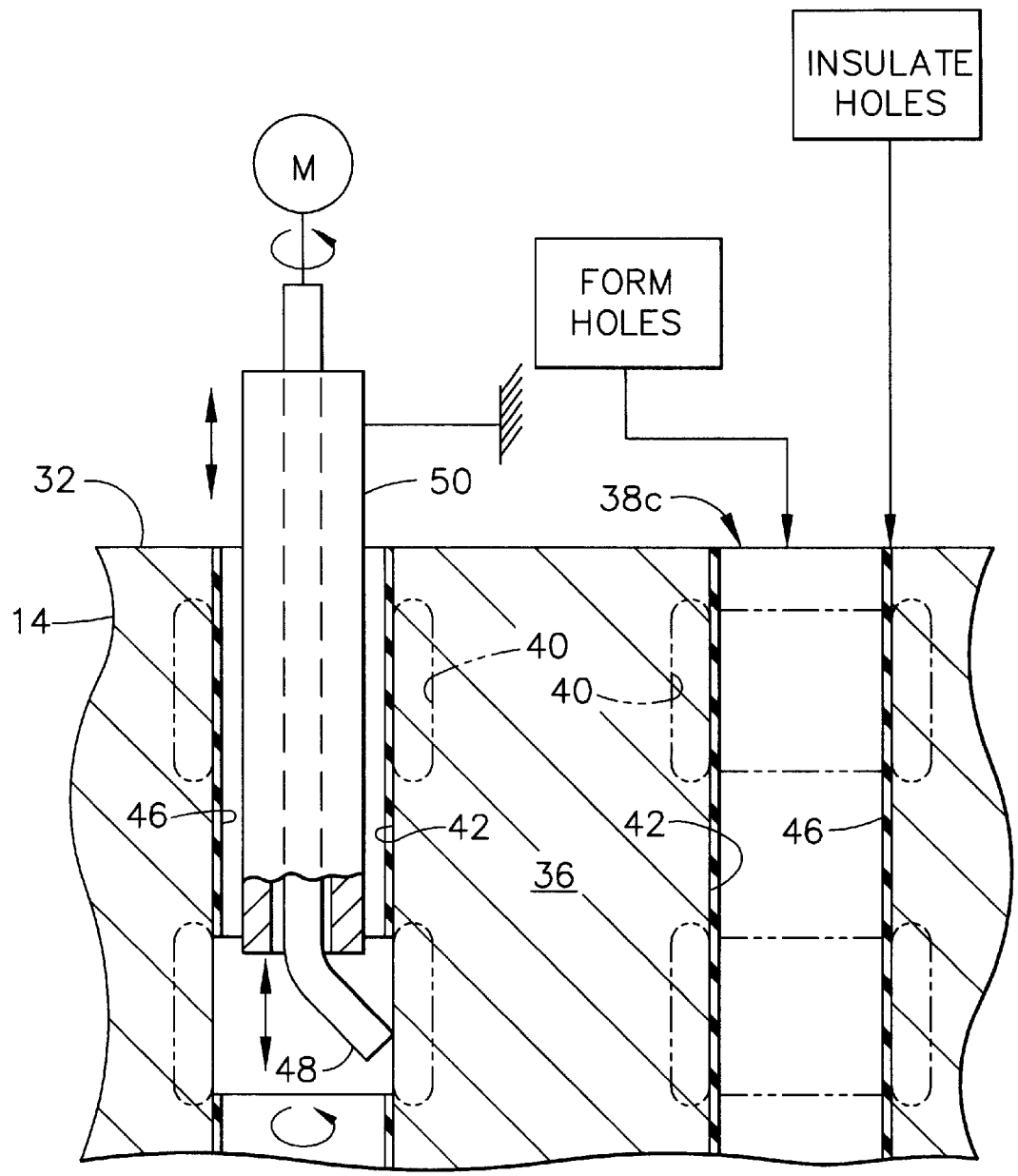
FIG. 3 is a sectional view of a portion of the airfoil trailing edge illustrated in FIG. 1 schematically showing a preferred method for forming the striated discharge holes therein.
Figure 4:
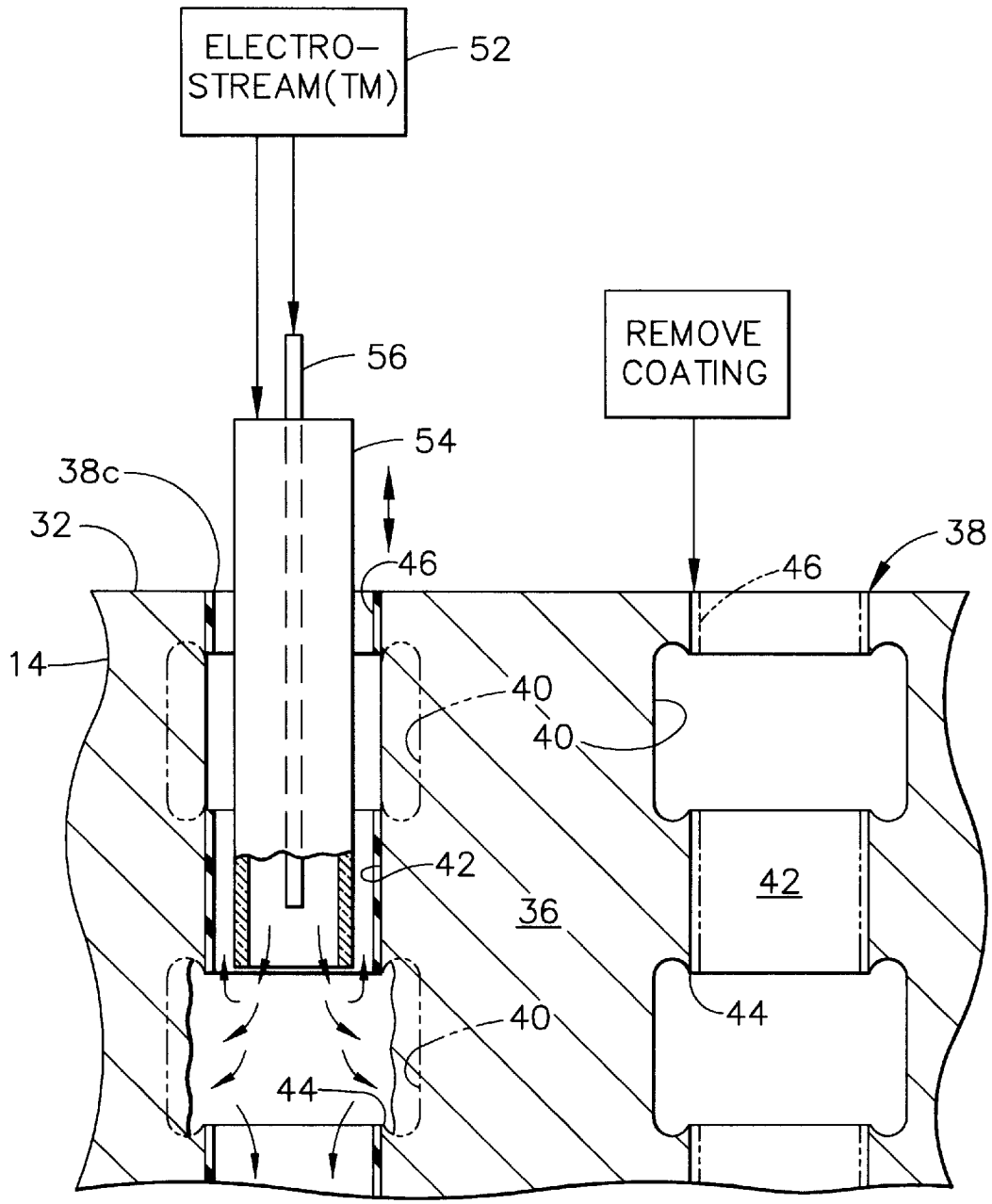
FIG. 4, like FIG. 3, illustrates schematically additional steps in the method of forming the striated discharge holes.

Illustrated schematically in FIGS. 3 and 4 is a method of making the airfoil 14, or other engine component, for incorporating the striated holes therein in accordance with an exemplary embodiment. The airfoil or other component is initially manufactured in any conventional manner such as being cast to shape with the internal channels formed therein.

As shown in FIG. 3, the individual discharge holes may be suitably formed in the wall 36 in an initial or first manufacturing step in the form of plain or cylindrical holes 38c. The initial plain hole 38c may be formed in any conventional manner such as by drilling, electrical discharge machining, or electrochemical machining in the preferred form of Electro-stream(™) process as commercially available from the General Electric Company, Cincinnati, Ohio.

In the next step, each of the holes 38c is electrically insulated at locations corresponding with the desired lands 42, with the locations of the desired grooves 40 being electrically uninsulated.

In this way, the plain holes 38c may be electrically eroded selectively at the groove locations for forming those grooves 40 without eroding or damaging the portions of the plain holes defining the lands 42.

In a preferred embodiment, the individual plain holes 38c are electrically insulated by coating the entire inner surface of each hole with a suitable electrically insulating coating 46, such as ordinary varnish for example. The varnish coating may then be selectively stripped at the groove locations for permitting electrical erosion thereof, while retaining the electrical insulation at the land locations.

Since the insulating coating 46 is relatively thin, it may be readily stripped away at the groove locations by scratching the coating thereat to expose the underlying wall or substrate material therebelow. Scratching may be effected by rotating a flexible wire 48, such as copper or any suitable metal, for using its tip to scratch away the coating where desired.

The scratching wire 48 is preferably disposed inside a supporting or protection tube 50, with the tube being disposed inside the plain hole 38c. The distal end or tip of the wire 48 extends outwardly from the distal end or tip of the tube so that under rotation of the wire, centrifugal force deflects the wire tip radially outwardly to scratch and remove the coating from the inside of the hole. The proximal end of the scratching wire 48 may be rotated using any suitable motor, such as by being mounted in a conventional drill press.

The protection tube 50 is preferably held stationary and adjusted in position over the length of the hole as desired. The scratching wire 48 is preferably axially translated, and oscillated if desired, within the protection tube 50 and inside the hole 38c as the wire rotates for scratching the coating along the axial extent of the groove location to expose the underlying metal substrate.

The wire and tube are repositioned within each of the plain holes to correspondingly selectively strip the insulating coating from the inside of the holes corresponding with the several locations where the grooves 40 are to be formed.

Although the insulating coating 46 is preferably applied over the entire inner surface of the individual holes and selectively removed in the preferred embodiment, the coating may be selectively applied only to the desired land locations in alternate embodiments as practical.

FIG. 4 illustrates the corresponding holes from FIG. 3 in which the coating 46 has been selectively stripped at the intended groove locations in the left hole. The groove locations are thusly unprotected whereas the land locations retain their coatings 46 and are protected. The holes may then be selectively eroded at the locations corresponding with the grooves for forming those grooves. In the preferred embodiment illustrated in FIG. 4, electrochemical machining in the preferred form of Electro-stream is used for eroding the substrate metal to form the corresponding annular grooves 40.

The Electro-stream process is commercially available from the General Electric Company as indicated above for drilling small and slender holes in workpieces, such as discharge holes in turbine airfoils. This conventional process may be modified in accordance with the present invention for use with the pre-drilled plain holes 38c for selectively eroding the grooves 40.

A conventional electrochemical machining apparatus 52 configured for Electro-stream operation is used in the preferred embodiment illustrated in FIG. 4. A hollow glass tube 54 is positioned inside the insulated plain hole 38c, and a thin electrode wire 56 is inserted in the tube. A suitable acid electrolyte flows through the tube 54, and the electrode wire 56 is powered with a relatively high voltage.

The electrolyte attacks and erodes the inner surface of the hole at the exposed, uninsulated groove locations, while the insulated land locations are protected. In this way, the individual grooves 40 may be electrochemically formed using otherwise conventional equipment. The tube 54 and wire 56 are indexed along the length of the hole for forming each of the desired grooves 40 in turn.

A particular advantage of using electrochemical machining is that erosion of the groove locations additionally undercuts the adjoining lands 42 to form the corresponding cusps 44 thereat. As indicated above, the sharp cusps 44 are preferred for enhancing the tripping effect thereof as opposed to a mere rounded corner in alternate embodiments.

Once all of the grooves 40 are formed in each of the holes, the remaining insulating coating 46 may be stripped or removed from the lands 42 in any conventional manner, such as by chemical stripping for example.

The striations defined by the alternating grooves and lands disclosed above are readily formed in relatively small and slender holes with remarkable accuracy and definition. Precise and sharp cusps are readily effected for enhancing coolant tripping. The depth of the individual grooves 40 may be relatively shallow without compromising the mechanical strength of the airfoil along its thin trailing edge. And, enhanced cooling is effected without introducing undesirable flow obstruction in the narrow discharge holes which retain their nominal small diameters.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by letters patent of the united states is the invention as defined and differentiated in the following claims in which we claim:

What is claimed is:

1. A turbine wall having a striated discharge hole extending therethrough with alternating grooves and lands of substantially equal length.

2. A turbine wall having a striated discharge hole comprising alternating annular grooves and tubular lands.

3. A wall according to claim 2 wherein said grooves undercut adjoining lands at corresponding cusps.

4. A wall according to claim 2 wherein said grooves and lands are coaxially aligned, with a collective length greater than a diameter of said hole.

5. A wall according to claim 4 wherein grooves are axially elongated.

6. A wall according to claim 2 wherein said each of said grooves is circumferentially continuous between adjoining lands.

7. A wall according to claim 2 wherein said striated hole further comprises an inlet 38a disposed inside said wall and an outlet disposed outside said wall.

8. A method of making said wall according to claim 2 comprising:

forming a plain hole through said wall;

electrically insulating said plain hole at locations corresponding with said lands; and electrically eroding said plain hole at locations corresponding with said grooves.

9. A method according to claim 8 wherein said hole insulating comprises:

coating said plain hole with an electrically insulating coating; and stripping said coating at said groove locations for retaining said electrically insulated land locations.

10. A method according to claim 9 wherein said coating is stripped at said groove locations by scratching said coating thereat to expose wall material therebelow.

11. A method according to claim 10 wherein said scratching comprises:

rotating a flexible wire inside a tube disposed inside said hole; and extending a tip of said wire from a tip of said tube to circumferentially scratch said coating under centrifugal force.

12. A method according to claim 11 further comprising axially translating said wire inside said hole as said wire rotates for scratching said coating along an axial extent of said groove location.

13. A method according to claim 9 wherein said hole eroding comprises electrochemical machining said groove locations.

14. A method according to claim 13 further comprising eroding said groove locations to undercut adjoining lands to form corresponding cusps thereat.

15. A method according to claim 9 further comprising stripping said coating from said lands after said grooves are formed.

16. A turbine airfoil comprising:

pressure and suction sides including a wall extending longitudinally from root to tip and chordally between leading and trailing edges; and a tubular discharge hole extending through said wall and terminating outside said airfoil, and being striated with radially recessed grooves therein.

17. An airfoil according to claim 16 further comprising:

an internal channel for channeling a coolant therethrough; and said striated hole includes an inlet joined with said channel, and an outlet disposed outside said airfoil for discharging said coolant.

18. An airfoil according to claim 17 further comprising a row of said striated holes spaced longitudinally apart between said root and tip along said trailing edge, and terminating thereat.

19. An airfoil according to claim 18 wherein said striated holes comprise alternating annular grooves and lands.

20. An airfoil according to claim 19 wherein:

said grooves and lands of each hole are coaxially aligned; and said grooves undercut adjoining lands at corresponding cusps.

* * * * *